United States Patent [19]

Helinski et al.

[11] 3,979,756

[45] Sept. 7, 1976

[54] METHOD AND APPARATUS FOR MERGING SATELLITES IN AN INK JET PRINTING SYSTEM

[75] Inventors: Edward F. Helinski, Johnson City; Jack L. Zable, Vestal, both of N.Y.

[73] Assignee: International Business Machines Corporation, Armonk, N.Y.

[22] Filed: Dec. 18, 1974

[21] Appl. No.: 534,043

[52] U.S. Cl. .................................... 346/1; 239/102; 346/75

[51] Int. Cl.$^2$ .......................................... G01D 15/18

[58] Field of Search ............... 346/75, 140; 239/102

[56] References Cited

UNITED STATES PATENTS 3,334,351 8/1967 Stauffer ................................ 346/75

*Primary Examiner*—Joseph W. Hartary
*Attorney, Agent, or Firm*—John S. Gasper

[57] ABSTRACT

In an ink jet recorder, a ferrofluid ink is supplied under pressure to a nozzle to form a continuous ink jet stream. The jet stream is subjected to two or more perturbation forces out-of-phase with each other causing the satellites and drops to fast merge. Plural electromagnetic transducers are located at spaced locations along the stream and energized to produce out-of-phase perturbations on the stream. The spacing of the transducers is differentially related to spacing of varicosities or ink drops produced by first transducer. The out-of-phase perturbations can also be obtained using an electromechanical transducer and electromagnetic transducers located out-of-phase or energized out-of-phase with each other.

15 Claims, 7 Drawing Figures

METHOD AND APPARATUS FOR MERGING SATELLITES IN AN INK JET PRINTING SYSTEM

CROSS-REFERENCES TO RELATED APPLICATIONS

Application of Joseph P. Pawletko and Bruce A. Wolfe entitled "Ink Jet Transducer", Ser. No. 317,503, filed Dec. 21, 1972, now abandoned, and Application of George J. Fan and Richard A. Toupin entitled "Method and Apparatus for Forming Droplets from a Magnetic Liquid Stream", Ser. No. 429,414, filed Dec. 28, 1973.

BACKGROUND OF THE INVENTION

1. Field of the Invention

This invention relates to ink jet recording and particularly to a method and apparatus for generating a stream of drops for use in an ink jet printer.

2. Description of Prior Art

In ink jet recording it is well-known to produce a stream of liquid ink under pressure and to produce perturbations in the stream to cause it to break up into individual uniformly spaced drops which are then directed in a controlled manner onto a record medium to visually record the information. The perturbations can be formed by electromechanical devices which vibrate the jet-forming elements or by the application of external fields to the unsupported jet stream which produce perturbations in the jet stream. U.S. Pat. No. 3,596,275, issued July 27, 1971 to Richard G. Sweet, shows using either a magnetostrictive vibrator or an excitational electrode for producing drops from a conductive ink jet. In U.S. Pat. No. 3,298,030, issued on July 12, 1965 to Arthur M. Lewis and Arling D. Brown, Jr., a piezoelectric transducer is used as the perturbation-producing means. In the previously-mentioned application, Ser. No. 429,414 of George J. Fan and Richard A. Toupin, drops are formed in a magnetic ink jet stream using externally-applied magnetic fields at plural uniformly-spaced positions along the stream, the spacing of the field-producing elements being equal to the wavelength of the perturbations produced in the stream or a multiple thereof.

One of the problems associated with previous drop generators has been the fact that as the stream breaks up into individual drops there is a tendency for satellites to form. The precise explanation of why satellites form is not fully understood; however, it has been observed that satellite drops, when formed, will usually form from the ligament portions of the jet stream which connect the varicosities produced by the perturbations. It has also been observed that the satellites can have a velocity equal to or different from the adjacent large drops. Depending on the relative velocity of the satellite and large drops merging will take place if their relative velocities are different. The rate at which merging takes place, however, can affect the control of the droplets and the print quality or contamination of the ink jet apparatus.

U.S. Pat. No. 3,683,396, issued Aug. 8, 1972 to Robert I. Keur, Sandra Miller and Henry A Dahl, attempts to solve the satellite problem by designing the nozzle to have fluid resonance to obtain the formation of fast satellites. The nozzle is designed so that its internal length is determined in relation to the speed of sound to the fluid in the nozzle and the desired frequency of resonance.

U.S. Pat. No. 3,334,351, issued Aug. 1, 1967 to Norman L. Stauffer, shows a method of merging satellite drops by disturbing the stream to impart a rolling motion to ink drops through the use of dual vibration means operated transverse to and in the direction of flow of the jet stream.

The previously-mentioned application of Joseph P. Pawletko and Bruce A. Wolfe shows a mechanical structure in which two piezoelectric devices operate in different modes on a cantilever beam to prevent formation of satellite drops by imparting a spin thereto.

It will be appreciated that the prior art solutions for eliminating or merging satellite drops require specialized complex structures. Furthermore, such structures lack versatility, since the mechanical devices once designed are strictly confined to specific operating conditions having a very narrow range. As the conditions of the ink and the operating properties of the system vary, the effectiveness of prevention or merging of satellites degrades considerably and the means for controlling the variation in operating conditions becomes complex and costly.

SUMMARY OF THE INVENTION

It is a general object of this invention to provide an improved method and apparatus for producing an ink jet stream comprised of individual ink drops.

It is a more specific object of this invention to provide an improved method and apparatus for fast merging satellite drops within a very short distance after drop breakup occurs.

It is a further object to provide a method and apparatus for merging drops in an ink jet stream which is simple in structure, easy to control and relatively easy to manufacture.

Basically, this invention achieves the above, as well as other objects by applying a perturbation force to the ink jet stream in advance of or after the drop breakoff position of the stream, said perturbation force including an out-of-phase force component to cause satellites and drops to merge. Basically, the out-of-phase force component operates to modify the shape of the undulation in the stream and the ligament extending from the undulations so that the ligament breakoff, if it occurs, will have a momentum causing it to merge rapidly with the main drop. The out-of-phase force component can also be applied after breakoff. In the preferred embodiment of this invention the liquid is a field controllable liquid such as magnetic ink and an out-of-phase force component is induced by a field force applied to the segment of stream which includes at least part of the undulation and the ligament portions of the jet stream. A preferred arrangement comprises a dual pole magnetic exciter located adjacent the magnetic ink jet stream as it emerges from a nozzle. The poles of the dual pole exciter are spaced differently along the jet stream relative to the wavelength of the undulations which is the wavelength of the drops. A cyclically varying energizing current is applied to the magnetic exciter. Due to the space differential between undulations formed in the stream and the poles of the exciter, the stream is caused to experience a spaced out-of-phase force which modifies the velocity distribution in the jet relative to the undulations and connecting regions where ligaments are formed. In the case of the magnetic inks and externally applied magnetic forces by the magnetic exciter, the magnetic fields induce a transient polarization in the stream causing the regions subjected to the field forces to experience longitudinal forces which affect modifications of the longitudinal velocity or momentum of the stream in the region of the undulation and connecting portions so that undulation and ligament shapes are modified so that if the ligament does break off independently of the drop to form a satellite, velocity differential exists between the satellite and drop to cause fast merging. The application of the out-of-phase force field component to the stream in the longitudinal direction is straightforward and readily achieved. Thus, the complexity of structures previously required to impart roll or spin to the droplets via bidirectional vibration is avoided. Merging of satellites can occur very rapidly using this invention and merging of satellites within a shorter distance than obtained without an exciter or one with pole spacing equal to drop separation has been achieved. Thus, the distance between drop formation and drop control for ink jet recording is greatly shortened and control capability over the drops is improved and greatly simplified due to elimination of satellites in the displacement control regions of the ink jet recorder.

The foregoing and other objects, features and advantages of the invention will be apparent from the following more particular description of preferred embodiments of the invention, as illustrated in the accompanying drawings.

DETAILED DESCRIPTION OF THE INVENTION

Figure 1:
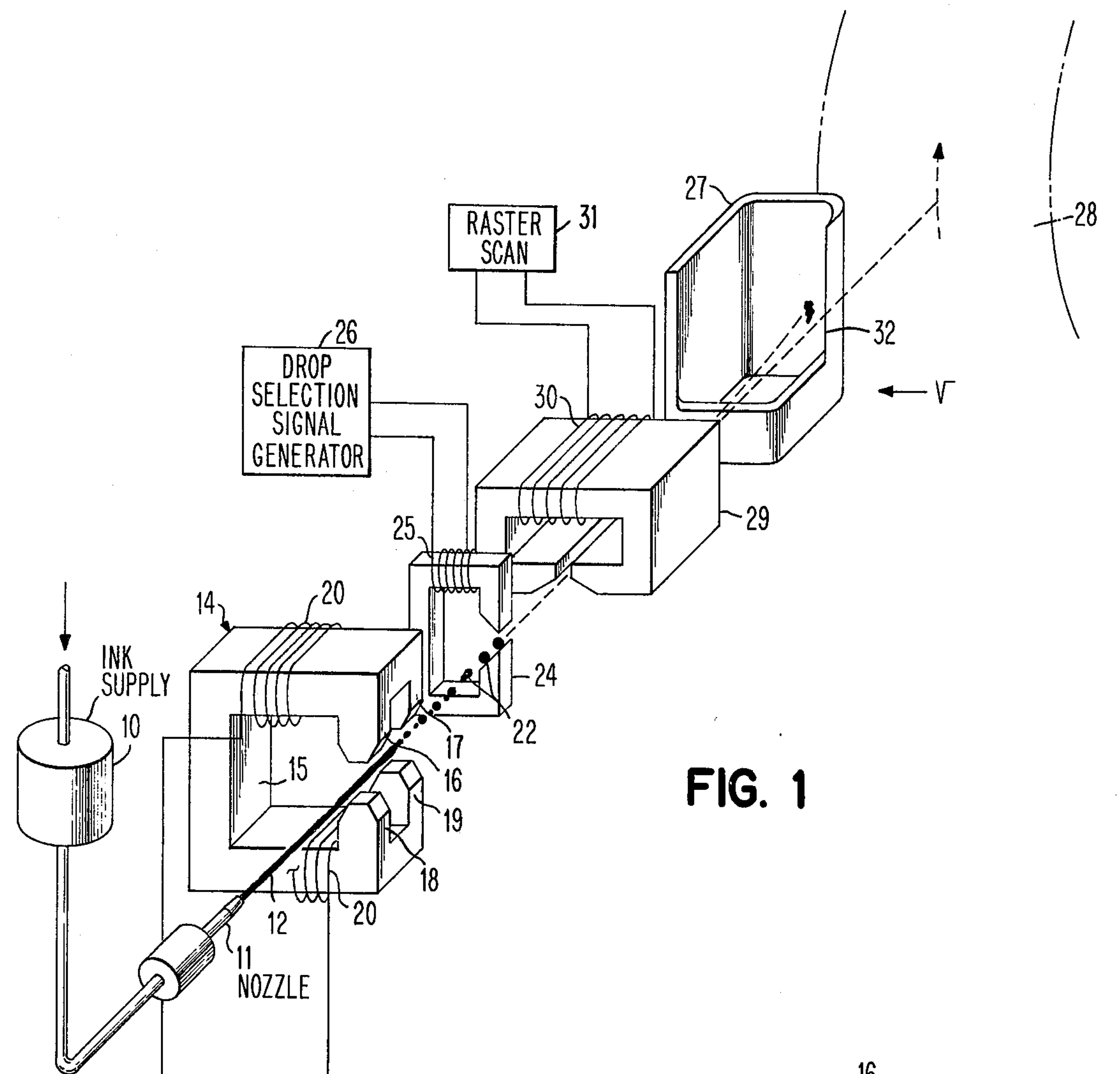
FIG. 1 is an isometric view of a schematic version of an ink jet printer incorporating one embodiment of a drop generator device in accordance with this invention.
Figure 1:
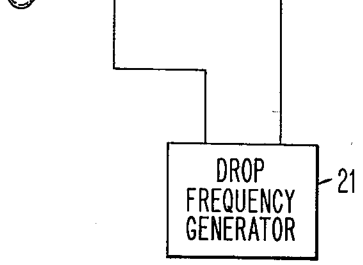

Referring to the drawings, and particularly FIG. 1, there is shown an ink supply 10 of magnetic ink. The magnetic ink may be any suitable magnetic ink which is preferably isotropic and virtually free of remanence. One suitable example of a magnetic ink is a ferrofluid of the type described in co-pending application of George J. Fan and Richard A. Toupin, entitled "Recording System Utilizing Magnetic Deflection", Ser. No. 284,822, filed Aug. 30, 1972, now U.S. Pat. No. 3,805,272 and assigned to the same assignee as the assignee of this application. Another example of the magnetic ink is a stable colloidal suspension in water of 100 angstrom-sized particles of magnetite ($FE_3O_4$) with surfactant surrounding the particles.

The ink supply 10 supplies the magnetic ink to a nozzle 11 under pressure, such as 20–50 psi, for example from which the ink issues as a stream 12 through an opening at the end of the nozzle 11. An exciter 14 is disposed in axial alignment with the path of the stream 12 as it exits from the nozzle 11. The exciter 14 comprises a C-shaped magnetic core 15 having upper poles 16 and 17 and lower poles 18 and 19 in mutual vertical alignment above and below the ink jet stream 12. The poles 16 through 19 may be tapered to concentrate the magnetic flux in the gap between the pole faces. A coil 20 is wound on the magnetic core 15 and preferably around the arm portion thereof to obtain a maximum flux concentration in the ends of the magnetic poles. The coil 20 is connected to a drop frequency generator 21 to receive a periodic current so that the C-shaped magnet 15 produces dual magnetic fields simultaneously from both sets of poles 16 and 18, and 17 and 19. The center-to-center spacing of the pole faces 16 and 17, and 18 and 19 in the direction of the stream is less than or greater than the distance between droplets 22 which are formed by the exciter 14 from stream 12. The length of each of the pole faces 16–19 which are substantially parallel to the axis of stream 12 is preferably about one-half of the wavelength of the perturbations produced in the stream 12 by the exciter 14 and is about three times the diameter of the stream 12.

Figure 6:
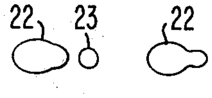
FIG. 6 shows merging for the exciter arrangement of FIG. 2.
Figure 5:
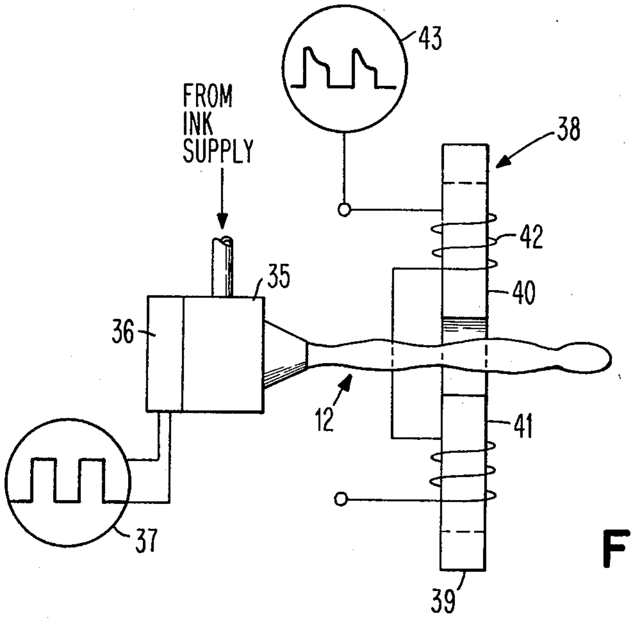
FIG. 5 is a schematic drawing showing the use of a piezoelectric crystal drop generator in combination with a single pole magnetic transducer for fast merging of satellites in a jet stream.
Figure 5:
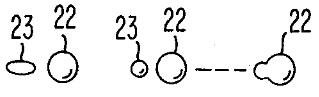

The gap between the pole faces 16 and 18, and 17 and 19 must not be too wide. Otherwise, the magnetic field produced by the current flowing through the coil 20 would not act on the stream 12 in the desired manner to produce the desired perturbations in the stream 12. This is due to the density of the magnetic field decreasing as the gap between the opposed pole faces increases. Similarly, the intensity of the magnetic field also decreases as the gap between the pole faces increases. Thus, the distance across the gap between the pole faces of each pole pair is about 2–3 times the diameter of the stream. Further details of the relationship of the gaps and magnetic fields may be obtained by reference to the aforementioned application of George J. Fan and Richard A. Toupin. The energization of the coil 20 of magnetic core 15 by the signal generator 21 produces multiple perturbations in the jet stream 12 to cause droplets 22 to break off from the stream in a succession of uniformly-spaced droplets of substantially uniform size. As seen in FIGS. 5 and 6, the break off of the drops 22 is accompanied by satellites 23 which have a velocity lesser and greater, respectively, than the droplet 22. The stream of ink drops then passes adjacent the gap in magnetic selector 24 having coil 25 which is selectively pulsed by a signal generator 26 in accordance with a data input to deflect predetermined drops 22 from the original jet stream trajectory to be ultimately caught by a gutter mechanism 27 located in front of the print medium 28. The drops 22 deflected by the selector magnet 24 and those drops not deflected thereby continue to move as a stream through a gap in deflector magnet 29 located in advance of the gutter 27 and print medium 28. A sawtooth signal from raster scan 31 applied to a coil 30 on deflector magnet 29 causes the selected and unselected drops 22 to be deflected vertically. Selected drops are caught by the gutter 27 whereas the unselected drops pass the knife edge 32 of the gutter to be deposited on the print medium 28 in accordance with the raster scan signal and the length of time that the individual drops are in the magnetic field generated by the deflector magnet 29. A relative lateral motion is provided between the medium 28 and the jet stream to thereby record information in the form of dot matrix characters or other symbols in a manner which is well-known.

Figure 2:
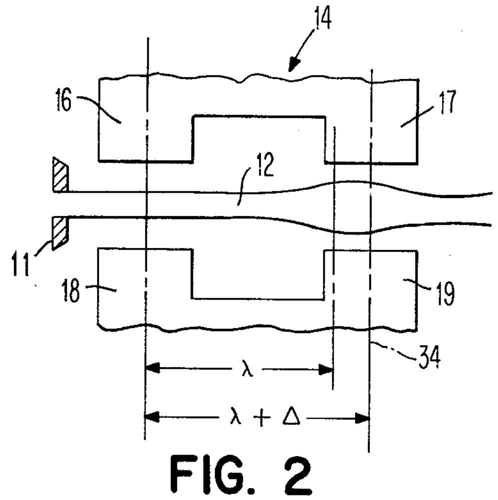
FIGS. 2 and 3 are schematic fragments showing the spatial relationship of the poles of the dual magnetic exciter of FIGS. 1 and 2 and to the desired wavelength of drops in an ink jet stream.
Figure 3:
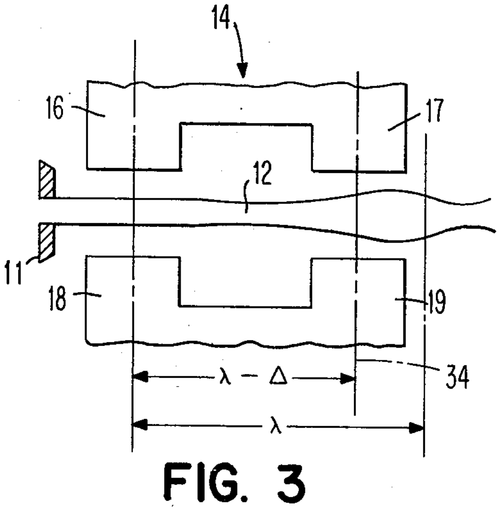

In accordance with this invention in its preferred embodiment, stream 12 is subject to multiple perturbations which produce undulations which ultimately cause satellites 23 to fast merge with drops 22 when breakup occurs. For this purpose in the preferred embodiment shown in FIG. 1 the longitudinal distance between the pole pairs 16 and 18, and 17 and 19 must be different from the wavelength of the varicosities (which is also the wavelength between drops) formed in stream 12. Thus, the distance between the center of the pole pairs 16 and 18 of exciter 14 from the center of the pole pairs 17 and 19 is some increment different from the spacing between the centers of the varicosities in stream 12. As shown in FIG. 2, the pole spacing is greater (i.e. $\lambda+\Delta$) than the wavelength ($\lambda$) of the drops. This causes satellites 23 to merge downstream after drop breakoff in the front of the drop 22, as seen in FIG. 6. FIG. 3 shows that the spacing of the centers of the magnetic poles is less (i.e. $\lambda-\alpha$) than the wavelength ($\lambda$) of the drops. This causes satellites 23 to merge downstream after breakoff in the rear of drop 22, as shown in FIG. 5. In general the spacing between poles can be $N(\lambda)\pm\Delta$, where N is an integer and $\lambda$ = distance between drops, and $\Delta$ is some increment different from the spacing between drops 22. The increment $\Delta$ can be up to ⅓ $\lambda$.

Figure 7:
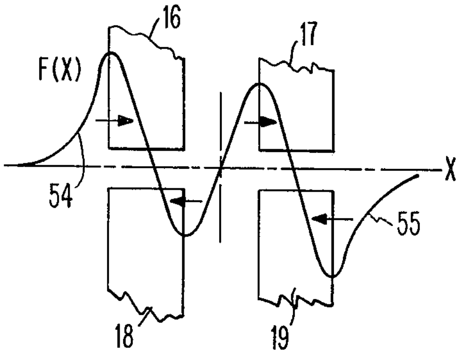
FIG. 7 shows the force field contours for dual pole magnetic exciter of FIGS. 2 and 3.

The explanation for this merging of satellites either in a forward or a rearward direction can be explained by the fact that spacing of the poles being different from the spacing of the varicosities causes the varicosity portion and ligament portion of stream 12 under the second pole pair to experience longitudinal acceleration forces in opposite directions. Thus, in FIG. 2, when the pulse occurs on the second pole pair (17 and 19), the varicosity produced by the perturbation force of the first pole pair 16 and 18 is to be left of center line 34 and the magnetic field acting on this segment of ferrofluid ink causes the mass of the varicosity portion to experience an acceleration force in the direction of stream flow while the ligament portion experiences a deceleration force in the opposite direction. This causes a change of momentum in the stream which causes the ligament and drop at breakoff downstream to move toward each other at different velocities to cause merging. In FIG. 3 the opposite occurs. The pulse on the second pole pair (17 and 19) causes the stream 12 to experience a perturbation force which causes the main drop portion of the varicosity to be decelerated and the ligament portion ahead of the pole pair to be accelerated. The energization of the exciter 14 causes varicosities to occur under the pole faces due to the interaction of the magnetic field generated at the poles and the magnetic particles in the ferrofluid. The field gradient operates to exert a longitudinal accelerating or decelerating force on jet stream 12 in the region which includes the varicosity and connecting ligaments in the jet stream. The contour of the force field for a constant current signal applied to coil 20 is illustrated by curves 54 and 55 of FIG. 7 for the pole pairs 16 and 17, 18 and 19. Since the pole pairs are driven by the same energizing signal, the spacing of the poles differentially relative to the wavelengths of the undulations causes an out-of-phase longitudinal force component to be applied to the varicosity and ligament portion proximate and in the vicinity of the second pole pair. Alternatively, the out-of-phase force effects can be achieved by separately energizing the pole pairs with out-of-phase current drivers.

In the embodiment of FIG. 5 a pressurized supply of ink is supplied to a chamber of a nozzle structure 35 where it is subjected to perturbations caused by electromechanical transducer 36, such as a piezoelectric crystal, attached to the nozzle and energized by signal generator 37. A single pole electromagnetic transducer 38 is located a distance downstream from the end of the nozzle 35 in advance of the location where the jet stream 12 would break up into drops 22 and satellites 23. The electromagnetic transducer 38 is preferably a C-shaped magnetic core 39 with poles 40 and 41 on opposite sides of stream 12. A coil 42 wound on poles 40 and 41 is energized at the same frequency as transducer 36 by signal generator 43. The frequency of the energizing signal applied to the coil 36 is the same and in phase with the signal applied to the piezoelectric crystal. With this arrangement, the piezoelectric crystal produces a first perturbation force onto the jet stream 12 causing varicosities to form at regularly spaced intervals. The electromagnetic transducer 38 applies a second perturbation which will be out of phase, i.e. offset, relative to the varicosity so that some of the ligament portion, and also some of the undulation portion, of the stream experiences opposite longitudinal forces as previously described when the transducer 38 is energized by signal from generator 43. Forward or rear merging of satellites can be obtained by adjustment of the location of the transducer 38 either rear or forward of the varicosity region, or by electrically energizing the transducer 38 with a drive signal out-of-phase with the drive signal for transducer 36. Since the location of the varicosity region is not easily observed without special instruments, the adjustment can be made by observation of the drops at breakoff point.

In a specific arrangement for the apparatus of FIG. 5, the following parameters were used:

Ink pressure - approx. — 50 psi
Nozzle diameter — 0.002 in.
Exciter peak current — 1.0 amp
Frequency exciter current — 35 Khz.
Voltage on transducer 36 — 100 volts
Drop spacing ($\lambda$) — 0.016 in.
Exciter pole gap — 0.006 in.

With this arrangement satellites merged within 4 wavelengths. With an unenergized exciter, merging occurred within 8 wavelengths.

In a specific arrangement for the embodiment of FIG. 2 the following parameters are exemplary:

Ink pressure — 20–30 psi
Drop spacing ($\lambda$) — 0.0125 and 0.015 in.
Frequency exciter current — 33 Khz. approx.
Nozzle diameter — 0.0025 in.
Thickness of poles — 0.008 in.
Center-to-center spacing between poles — 0.015 in.
Exciter pole gaps — 0.006 in.

In this arrangement, with pole pair spacing equal to the drops wavelength, merging occurred in 8 drop wavelengths. With the pole pair spacing greater than the drop wavelength, merging occurred within 5 drop wavelengths.

Figure 4:
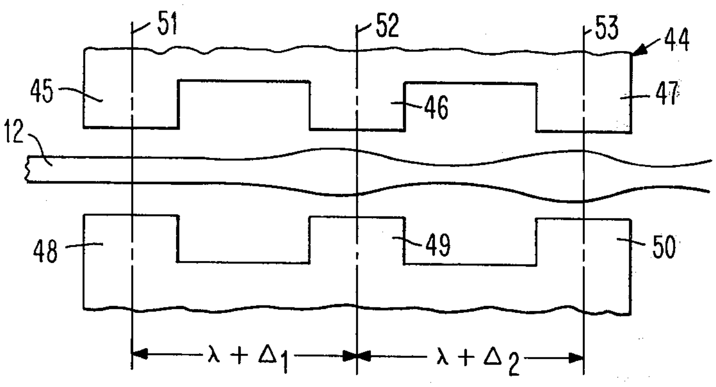
FIG. 4 is a schematic illustrating the pole spacing for a magnetic transducer having three poles.

In the embodiments discussed, the perturbation producing devices apply dual perturbations out of phase with each other. In the embodiment of FIG. 4, an electromagnetic transducer 44 operates on a magnetic stream 12 at three spaced locations. The pole pairs 45 and 48, 46 and 49, and 47 and 50 are differentially spaced relative to each other and the varicosities of the stream ($\lambda+\Delta_1$) and ($\lambda+\Delta_2$) as illustrated in connection with the spacing of center lines 51, 52, and 53. The first two pole pairs when energized operate substantially as described for the other embodiments. In the transducer 44 a third perturbation force is applied to the varicosities causing further momentum changes in the stream for additional merging effects.

Thus, it can be appreciated that a more effective control over satellite merging can be obtained with relatively simple structures easy to fabricate and operate. A versatility is also provided which enables merging to be caused either in a forward or rear direction.

While the invention has been particularly shown and described with reference to preferred embodiments thereof, it will be understood by those skilled in the art that the foregoing and other changes in form and details may be made therein without departing from the spirit and scope of the invention.

We claim:

1. In an ink drop forming system of the type having means for supplying magnetic ink under pressure to a nozzle or the like to cause a continuous jet stream of magnetic ink to flow from said nozzle and magnetic transducer means for applying periodic perturbations at plural spaced locations along said stream in advance of drop breakoff, a method of controlling the merging of satellites comprising making the spacing between said spaced location different from the wavelength of the perturbations.

2. A liquid jet apparatus comprising, means for projecting a liquid jet stream, and means for producing regularly spaced varicosities in said jet stream for producing drops of substantially uniform size and spacing, said means for producing said regularly spaced varicosities comprising first means for cyclically perturbing said stream with a first longitudinal force component in said jet stream, and second means for cyclically perturbing said stream with a second longitudinal force component in said jet stream out of phase with the wavelength of said varicosities produced by said first perturbing means.

3. A liquid jet apparatus in accordance with claim 2 in which said jet stream is formed of field controllable fluid, and said means for perturbing said stream with said second longitudinal force component includes a field transducer means located proximate said jet stream in an out-of-phase relationship with the wavelength of said varicosities produced in said stream by said first stream perturbing means.

4. A liuqid jet apparatus in accordance with claim 3 in which said jet stream is formed of magnetic liquid, and said means for perturbing said stream with said first and second longitudinal force components in said jet stream comprises magnetic transducer means located proximate said jet stream at at least two spaced locations, said spaced locations being differentially related to the spacing of varicosities in said jet stream.

5. A liquid jet apparatus in accordance with claim 4 in which said magnetic transducer comprises a magnetic core device said magnetic core device having two pole sections located at spaced locations along said jet stream, said spaced locations being differentially related to the spacing between varicosities in said jet stream, and means for cyclically energizing said magnetic core for producing differentially spaced magnetic fields causing said first and second longitudinal force components in said jet stream.

6. A liquid jet apparatus in accordance with claim 3 in which said jet stream is formed of field controllable liquid, and said means for perturbing said stream with said first and second longitudinal force components in said jet stream comprises field transducer means proximate said jet stream, said field transducer means being operable for generating said first and second longitudinal force components at plural spaced locations along said jet stream at a location in advance of said drop breakoff position, said spaced locations being differentially spaced relative to varicosities induced in said jet stream.

7. A liquid jet apparatus in accordance with claim 6 in which said plural spaced locations have a distance greater than the spacing of successive varicosities in said jet stream.

8. A liquid jet apparatus in accordance with claim 6 in which said plural spaced locations have a distance less than the spacing of successive varicosities in said jet stream.

9. A liquid jet apparatus in accordance with claim 6 in which the difference in said spacing of said locations and said varicosities is within the range of ± ⅛ the distance between the varicosites or multiples thereof.

10. A liquid jet apparatus in accordance with claim 2 in which said jet stream is formed of field controllable fluid said first stream perturbing means is a cyclically operable vibratory device, and said second stream perturbing means is a field transducer proximate said jet stream at a location and operable out-of-phase relative to the wavelength of varicosities produced in said stream by said first stream perturbing means.

11. A liquid jet apparatus in accordance with claim 10 in which said ink jet stream is formed of a ferrofluid ink, said vibratory device is an electromechanical device, and said second stream perturbing means is a magnetic field transducer operable on said jet stream in advance of the drop break off region of said stream.

12. A liquid jet apparatus in accordance with claim 3 in which said second means for perturbing said stream with said second longitudinal force component includes a field transducer located proximate said jet stream beyond the drop breakoff position of said stream and in an out-of-phase relationship with the wavelength of said varicosities produced in said stream by said first stream perturbing means.

13. A liquid jet apparatus in accordance with claim 2 in which said first means is a first transducer for applying periodic perturbations to said jet stream whereby varicosities are produced along said stream to cause said stream to break up into drops, and said second means is a second transducer located along said stream for applying periodic perturbations to said stream out of phase with the spacing of said varicosities.

14. A liquid jet apparatus in accordance with claim 13 in which said liquid jet stream is a ferrofluid, said first transducer is an electromechanical transducer, and said second transducer is an electromagnetic transducer proximate said stream.

15. A liquid jet apparatus in accordance with claim 14 in which said first transducer is a piezoelectric device.

* * * * *

UNITED STATES PATENT OFFICE

CERTIFICATE OF CORRECTION

PATENT NO. : 3,979,756

DATED : September 7, 1976

INVENTOR(S) : Edward F. Helinski and Jack L. Zable

It is certified that error appears in the above-identified patent and that said Letters Patent are hereby corrected as shown below:

Column 3, line 44, after "shows" the word --drop-- is missing. Column 7, Claim 4, line 53, --liquid-- is misspelled as "liuqid". Column 8, Claim 6, line 7, "claim 3" should read --claim 2--; Claim 12, line 52, "claim 3" should read --claim 2--.

Signed and Sealed this

Seventh Day of December 1976

[SEAL]

*Attest:*

RUTH C. MASON
*Attesting Officer*

C. MARSHALL DANN
*Commissioner of Patents and Trademarks*